United States Patent [19]

Mannheimer et al.

[11] Patent Number: 4,854,001
[45] Date of Patent: Aug. 8, 1989

[54] DISKETTE CLEANER

[76] Inventors: Lee R. Mannheimer, 3219 W. Sierra Dr., Westlake Village, Calif. 91362; A. Lody De Ridder, 433 Bradrick Dr., Carson, Calif. 90745

[21] Appl. No.: 53,132

[22] Filed: May 21, 1987

[51] Int. Cl.$^4$ .......................... G11B 3/58; B08B 11/02
[52] U.S. Cl. .................................. 15/97 R; 15/21 B; 369/72
[58] Field of Search ....................... 360/120, 132, 133; 116/284; 15/21 R, 21 B, 21 C, 97 R; 369/72

[56] References Cited

U.S. PATENT DOCUMENTS

| | | | |
|---|---|---|---|
| 418,608 | 12/1889 | Fowler | 116/284 |
| 1,150,088 | 8/1915 | Willson | 116/284 |
| 2,527,095 | 10/1950 | Hare | 116/284 |
| 2,924,022 | 2/1960 | Callahan | 116/284 |
| 3,803,660 | 4/1974 | Jividen et al. | 15/21 C |
| 4,101,948 | 7/1978 | Tadokoro et al. | . |
| 4,107,810 | 8/1978 | Varni | . |
| 4,162,552 | 7/1979 | Winter | 15/21 B |
| 4,489,740 | 12/1984 | Rattan | . |
| 4,490,767 | 12/1984 | Neuman | . |
| 4,520,470 | 5/1985 | d'Alayer | . |
| 4,604,672 | 8/1986 | Davis et al. | . |
| 4,654,917 | 4/1987 | Yeung | 15/97 R |

Primary Examiner—Edward L. Roberts
Attorney, Agent, or Firm—Lyon & Lyon

[57] ABSTRACT

A diskette cleaner having first and second pad-holding assemblies for cleaning both faces of a diskette. Means associated with one of the pad-holding assemblies are provided to support a diskette for rotation between the cleaning pads and to rotate the diskette while means associated with the other of the pad-holding assemblies are provided to indicate the rotational speed of the diskette and to introduce cleaning fluid into the cleaning pads.

4 Claims, 3 Drawing Sheets

DISKETTE CLEANER

BACKGROUND OF THE INVENTION

The field of the present invention is apparatus for cleaning and maintaining information storage diskettes such as flexible magnetic "floppy" disks and optical-read "compact" disks.

The use of rotating diskettes as storage media for digital information has proven advantageous in the computer industry due to the ability to store large quantities of information which can be readily accessed. Digital storage diskettes are also becoming increasingly popular in the audio field as media for storing optically encoded audio information. In operation, magnetic floppy disks and optical-read compact disks are rotated about a central axis. Information that is encoded on both surfaces thereof in concentric tracks is retrieved by a radially movable read device.

Floppy disks, as the name implies, are relatively flexible and are typically placed in an envelope designed to remain stationary while the disk spins. A central opening in the envelope allows the disk to be engaged by a spindle for rotation while a radial slot therein permits read/write operations. Compact disks are typically formed from rigid plastic and do not require an envelope.

In order to perform satisfactorily, information storage disks should be kept free of dust, oils, and other contaminants which can degrade the quality of the disk surface and result in media failure. Such contaminants may be airborne or deposited by persons handling the disk. Fingerprints are a major problem, particularly in the case of compact disks, which are not enclosed in a protective envelope. Even the most careful user may find it difficult to keep the disk surface free from finger contact.

Proper care of information storage disks thus requires periodic cleaning, preferably using specially formulated solutions which wash the disk surface and may also act as an antistatic agent to limit the accumulation of airborne particulates. Cleaning a disk should not be an overly complicated endeavor. A procedure akin to that used to clean phonograph records would be desirable. However, whereas the cleaning of phonograph records is typically accomplished by placing the record on a turntable and holding a brush or pad over the moving surface, such a procedure may not be practical for cleaning floppy and compact disks. The floppy disk is exposed only through a narrow read/write window in the protective envelope which is not accessible when the disk is inserted in the drive unit. The compact disk is typically not exposed during rotation by the disk player.

Although apparatus for cleaning floppy disks have been proposed, as for example in U.S. Pat. Nos. 4,390,767, 4,604,672 and 4,107,810, these devices are relatively complex and perhaps unnecessarily sophisticated for certain users. Apparatus for cleaning compact disks have also been proposed, as for example in U.S. Pat. No. 4,520,470. That apparatus, however, cleans only one side of a disk at a time and may require excessive amounts of cleaning solution.

Accordingly, an apparatus for cleaning several types of disks, including floppy and compact disks, which is relatively uncomplicated, capable of cleaning both sides of a disk simultaneously and which requires minimal application of cleaning solution, would be desirable.

SUMMARY OF THE INVENTION

The present invention is directed to apparatus for cleaning information on storage diskettes. To that end, first and second cleaning pads are provided for cleaning opposed faces of a diskette. Means are further provided in association with at least one of said cleaning pads for supporting the diskette for rotation between the pads.

Figure 1:
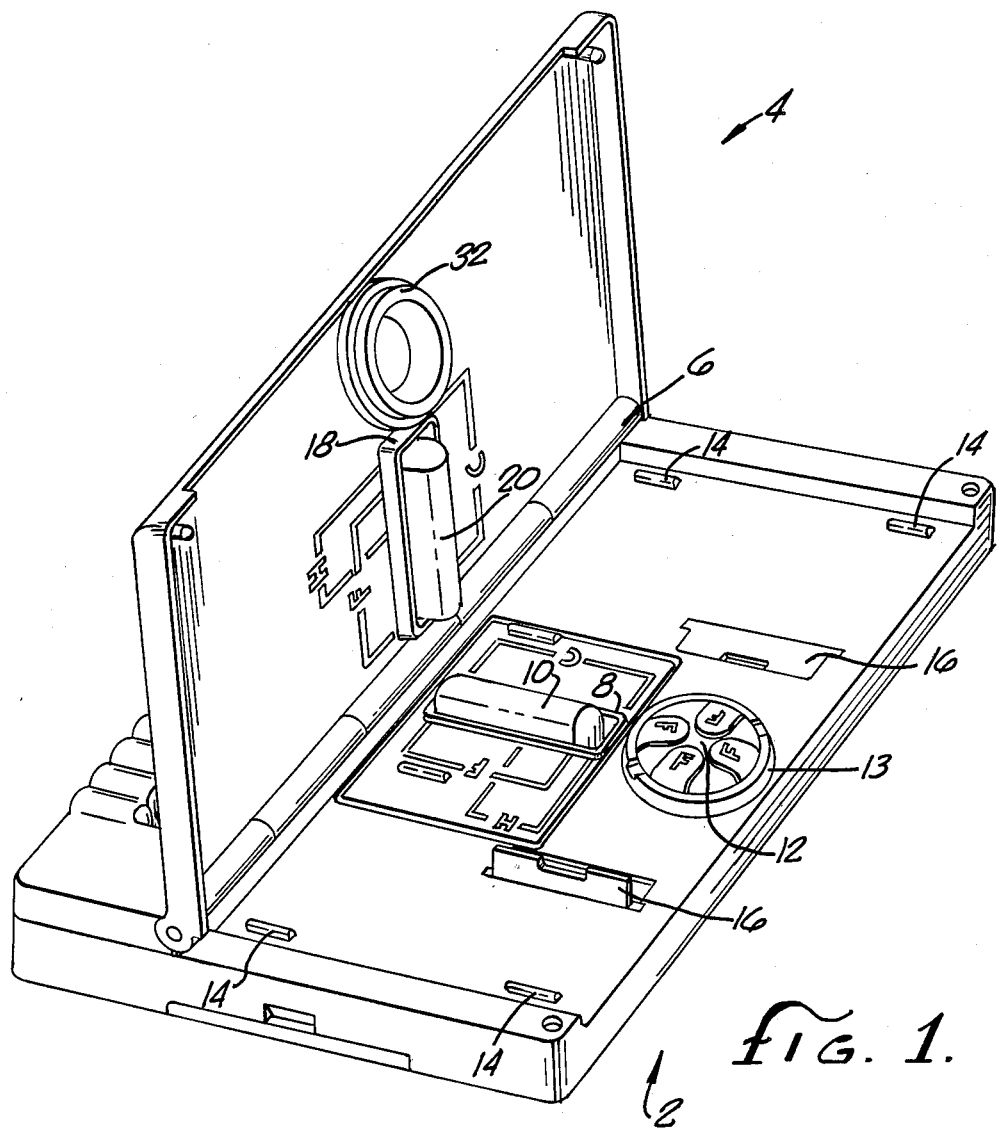
FIG. 1 is a perspective view of a diskette cleaner constructed in accordance with the present invention.

DETAILED DESCRIPTION OF PREFERRED EMBODIMENTS:

With reference to FIG. 1, a diskette cleaner comprises a first pad-holding assembly 2, representing a base, and a second pad-holding assembly 4, representing a lid, mounted thereto at an interface 6 which is shown here as a pivotal connection. The first pad-holding assembly 2 includes a slot 8 that supports a cleaning member 10 for cleaning one face of a disk. Preferably, the cleaning member 10 is formed as a bar-shaped pad of fluid absorbent material. The slot 8 is sized to support pads of varying size, in accordance with the type of disk to be cleaned. The diskette cleaner of FIG. 1 is adapted to clean three types of disks, $3\frac{1}{2}''$ diameter floppy disks, $5\frac{1}{4}''$ diameter floppy disks and compact disks. Adjacent the slot 8 are the designations "F", "H" and "C" and associated markings which indicate how the cleaning pads should be positioned in the slot 8. In the diskette cleaner of FIG. 1, the pad 10 has been placed in the "F" position in order to clean a $5\frac{1}{4}''$ floppy disk. The "F" position is designed such that the pad 10 will align with the window in the floppy disk envelope in order to contact the disk. The second pad-holding assembly 4 is also provided with a slot 18 for supporting a cleaning member 20 for cleaning the opposing face of the disk, and further includes the "F," "H" and "C" pad positioning designations previously described. The first pad-holding assembly 2 further includes a handhold 11 so that the cleaner may be held during use.

Figure 2:
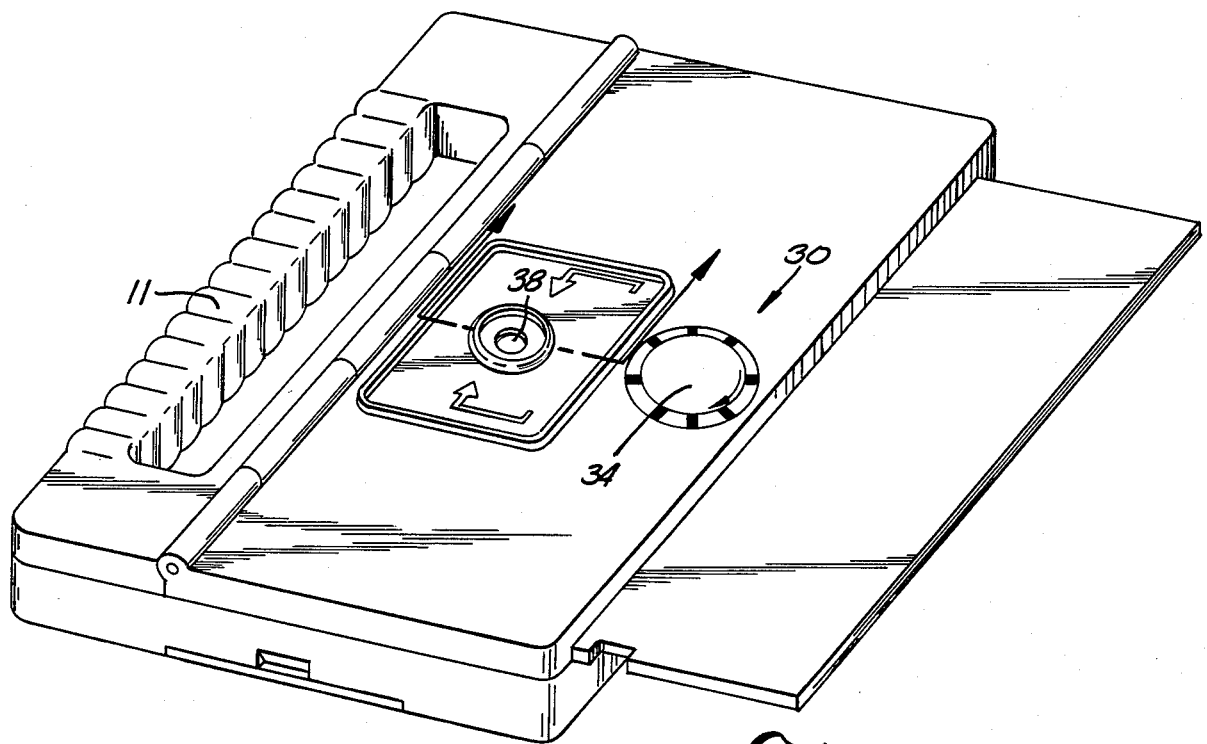
FIG. 2 is a perspective view of the diskette cleaner shown in FIG. 1 showing one side thereof.
Figure 4:
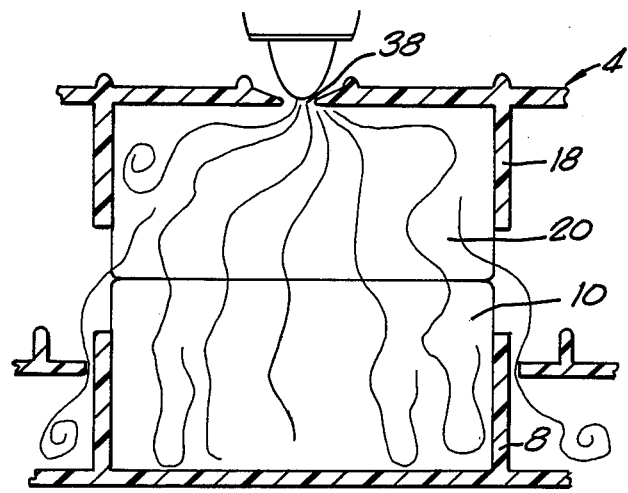
FIG. 4 is sectional view of the diskette cleaner shown in FIG. 1 taken along a line through the disk cleaning pads.

FIG. 1 shows the diskette cleaner in an open position wherein the pads are not in contact and wherein a disk may be inserted or removed. FIGS. 2 and 4 show the diskette cleaner in the closed position wherein the pads are in contiguous or proximal relation and a disk may be cleaned.

Figure 5:
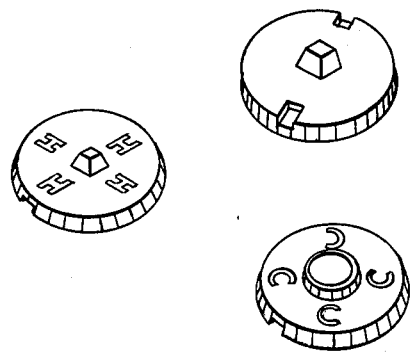
FIG. 5 is a perspective view showing various drive adaptors for supporting different disk types.

A disk selected for cleaning can be supported for rotation on a spindle 12 which is shown here as being adapted for $5\frac{1}{4}''$ floppy disks. FIG. 5 shows alternative spindles adopted for $3\frac{1}{2}''$ floppy disks and compact disks. The spindle 12 is supported in turn by a main drive member 13 rotatably mounted to the pad-holding assembly 2. The drive member 13 is preferably made of neoprene or other resilient material. The bottom f each spindle is provided with an extension adapted to engage a corresponding aperture in the drive member 13. To assist in stabilizing disks that are supported on the spindle 12, the first pad-holding assembly 2 is provided with stabilizers 14 for 5¼" floppy disks, and stabilizers 16, which are pivotally mounted to the first pad-holding assembly 2, for 3¼" floppy disks.

Figure 3:
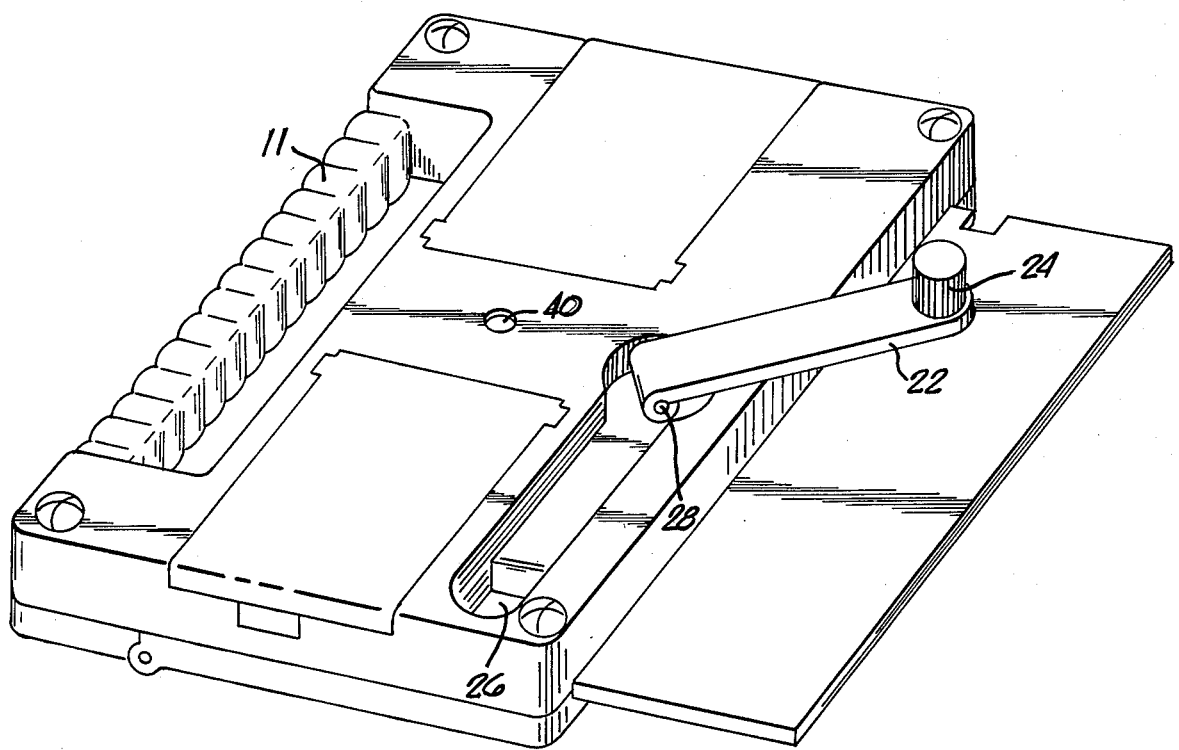
FIG. 3 is a perspective view of the diskette cleaner shown in FIG. 1 showing another side thereof.

As shown in FIG. 3, the first pad-holding assembly 2 includes means for rotating a disk in the form of a high-speed crank 22, having a finger grip 24 mounted thereon. Although not shown, the crank 22 is mounted within the pad-holding assembly 2 to the main drive base 13. Rotating the crank 22 rotates the drive base 13, the spindle 12 mounted thereon, and consequently, the disk mounted on the spindle. The crank 22 is designed to provide relatively high speed rotation which, it has been determined, is advantageous for developing a microscopically clean disk or diskette. Preferred speeds are 60 r.p.m. for compact disks and 30 r.p.m. for floppy disks although other speeds would also be possible. For storage, the pad-holding assembly 2 contains a slot 26, while the crank 22 is provided with a pivot 28 designed such that the crank may be positioned in the slot 26 when not in use.

Referring to FIGS. 1 and 2, the second pad-holding assembly 4 is provided with a rotation indicator assembly 30 to indicate when a disk is rotating at optimum speed. The indicator assembly 30 includes a rotatably mounted pressure drive clutch 32, preferably constructed of neoprene, positioned for engagement with the spindle 12 mounted on the first pad-holding assembly 2. Attached to the pressure drive clutch 32 is a speed indicator 34 which is provided with a series of markings arranged about the circumference thereof.

Also provided in the pad-holding assembly 4 is an aperture 38 positioned above the cleaning pad 20. Introducing fluid into the aperture 38 when the diskette cleaner is in the closed position, will result in fluid being absorbed into the pads 20 and 10. As shown in FIG. 3, an evaporation vent hole 40 is provided in the first pad-holding assembly 2 to remove excess fluid.

To operate the cleaner, a disk is mounted on the spindle 12 and the cleaner is placed in the closed position. After introducing cleaning fluid into the aperture 38, the user grasps the handhold 11 and turns the crank 22 until the predetermined rotational speed is reached. That speed is preferably maintained for ten (10) seconds. Thereafter, the disk should be ready for use.

Thus, a diskette cleaner is disclosed for cleaning information storage diskettes. While embodiments have been shown and described, it would be apparent to those skilled in the art that many more modifications would be possible without departing from the inventive concepts herein. The invention, therefore, is not to be restricted except in the spirit of the appended claims.

What is claimed is:

1. A device for cleaning a diskette comprising:
   a base;
   a lid pivotally mounted to said base;
   a pair of cleaning pads, one of said cleaning pads being fixedly mounted to said base, and the other of said cleaning pads being fixedly mounted to said lid, said pads being adapted to clean opposing sides of a diskette; and
   means for rotating a diskette relative to said pads.

2. The device set forth in claim 1 wherein said lid includes means for indicating diskette rotational speed.

3. The device set forth in claim 1 wherein said means for rotating the diskette includes a drive spindle mounted in said base adapted to engage the diskette.

4. A device for cleaning a diskette, comprising:
   a base;
   a first cleaning pad-holding slot mounted on said base;
   a first cleaning pad for cleaning a first face of a diskette, said pad being releasably mounted in said first pad-holding slot;
   a lid pivotably mounted to said base;
   a second cleaning pad-holding slot mounted on said lid;
   a second cleaning pad for cleaning the second face of the diskette, said pad being releasably mounted in said second pad-holding slot;
   a drive member rotatably mounted on said base;
   a crank engaged to said drive member for rotating said drive member;
   a spindle releasably mounted on said drive member for supporting a diskette for rotation between said first and second cleaning pads;
   a speed indicator for indicating the speed of rotation of a disk, said indicator being mounted on said lid and positioned for engagement with said spindle; and
   a fluid introduction aperture disposed in said lid for introducing fluid into said first and second cleaning pads.

* * * * *